United States Patent Office 3,271,143
Patented Sept. 6, 1966

3,271,143
PHOTOCONDUCTOR SHEET MATERIAL
David P. Sorensen, White Bear Lake, Minn., assignor to Minnesota Mining and Manufacturing Company, St. Paul, Minn., a corporation of Delaware
No Drawing. Filed Jan. 6, 1964, Ser. No. 336,066
10 Claims. (Cl. 96—1.7)

This application is a continuation-in-part of United States Serial No. 129,950, filed August 8, 1961, now abandoned.

This invention relates to improved photoconductor sheets. More specifically, it relates to photoconductor sheets which have been sensitized with a photoreducible dye in the presence of an excess of a complexing agent for the metal ions of the photoconductor. This invention is especially useful in the preparation of photoconductor sheets from zinc oxide using photoreducible, blue sensitizers (yellow dyes) and will be illustratively described with particular reference to this preferred system.

The photoconductor sheets made possible by this invention have greater total conductivity due to the incorporation of the complex forming agent. Because of the increased photoconductivity accomplished at a low concentration of dye sensitizer and/or the improved utilization of sensitizing dyes, this invention also makes possible the preparation of improved zinc oxide photoconductor sheets which are less intensely colored, e.g. have better whiteness.

As a general rule, yellow dyes do not markedly improve the sensitivity of photoconductor sheets, and accordingly, another advantage to the instant invention is the improved "blue" sensitization made possible.

Likewise, by the use of complexing agents, it is possible to use certain yellow dyes as sensitizers, which have heretofore been ineffective.

The above advantages are accomplished by incorporating a complexing agent in photoconductor sheets when a photoreducible dye is employed as the sensitizer. It is thought that this complexing agent may function to prevent the premature reduction of the sensitizing dye by the metal ions of the inorganic photoconductor, which are present at or near the photoconductor surface. It is also thought that the complexing agent may serve as a electron donor for the dye, but not as a reducing agent for the metal ions. The dyes which undergo photoreduction easiest are the dyes which are aided most by the use of complexing agents.

Various materials for forming metal complexes are known. They will, of course, vary somewhat with the inorganic photoconductor, e.g. zinc oxide, indium oxide, etc., as to the extent of their effect on improved sensitivity and sheet color. Because sheet whiteness is particularly important in some methods of image reproduction, such as in electrolytic electrophotography described in United States Patents Nos. 3,010,883 and 3,010,884, those complexing agents which are not strongly colored are preferred. Accordingly, optical or dye sensitizers for zinc oxides are avoided as the complexing agent for zinc ion, particularly when white sheet appearance is desired. Thus, the preferred complexing agents of this invention are not, per se, optical or dye sensitizers for the photoconductor. For example, complexing agents especially useful in combination with zinc ion are triethanolamine and 2,4-pentanedione. In the manufacture of zinc oxide photoconductor sheets, it is preferred that solutions made from highly basic complexing agents, e.g. triethanolamine, be adjusted to pH of 7. It is also important that a molar excess of the complexing agent be employed. It is preferable that a 10 to 100 molar excess of the complexing agent be employed, based on the molar concentration of the dyestuff employed.

Preferred embodiment

USP–12 zinc oxide and a copolymer of butadiene (30 mol percent) and a styrene (70 mol percent), (Pliolite S-7, a product of the Goodyear Tire and Rubber Co.), as a binder, in a zinc oxide to binder ratio of 4.5:1 were added to equal parts by weight of toluene. After milling the mixture for four hours, the mixture was sensitized in the absence of light with proflavine hydrochloride, a photo-reducible dye, by the addition of an alcohol solution (2.0 percent by weight) of the dye such that the dye concentration in the total mixture is 0.5 percent by weight based on the weight of zinc oxide. Triethanolamine, complexing agent, adjusted to a pH of 7.0 with hydrochloric acid was then added to the mix in molar excess of 100 based on the molar concentration of proflavine hydrochloride. This mixture was then milled for an additional thirty minutes and coated onto a flexible aluminum foil at a wet thickness of 1.5–2.0 mils.

Upon drying and without any prior light exposure, the resulting photoconductor sheet was observed to be white in color and had a sensitivity (i.e. light conductivity minus dark conductivity) of $80 \times 10^{-7}$ mhos per square inch after a fifteen second exposure of 10 foot candles from a tungsten source. The sensitivity was measured by placing a Nesa glass conduction plate in contact with the dry exposed zinc oxide as the anode (the aluminum backing served as the cathode) and applying a 30 volt D.C. across the electrodes. A sheet prepared in the same manner with proflavine hydrochloride without the triethanolamine complexing agent, had a sensitivity of $3.4 \times 10^{-7}$ mhos under the same exposure conditions and measured in the same manner.

An alternative test for improved sensitivity is as follows. The zinc oxide- electrically insulating binder is coated onto a polyester backing which has been vapor coated with aluminum (one ohm per square) to provide a wet coating thickness of 3 mils. The dry coating thickness is about 0.5 mil. After coating the film is dried in the dark for at least 12 hours. The film sample is then placed under a step table having density wedges varying in transmission from 0% to 100%. Exposure is made using a spectrograph providing light from 350 millimicron to 700 millimicron. After exposure the film is placed in an aqueous bath containing silver ions on a positively charged cyan dye and electrolytically developed, with the aluminum vapor coat serving as cathode, at 15 volts D.C. for a period of five seconds. A differential pattern is produced in correspondence with the various wavelengths, which effectively provide a plot of film sensitivity vs. light wavelength. The length of exposure is determined by trial and error for a control sample containing the photoreducible sensitization dye or dyes, it being necessary that the developed pattern for the control sample be visible over several of the density ranges provided by the step table. By exposing and developing film samples which additionally contain a complexing agent, the improvement in sensitivity can be observed. To optimize the formulation, samples with varying concentration levels of the complexing agent are run in the above procedure. The improvement in sensitivity is related to the increase in light conductivity of the photoconductor sheet, the dark conductivity remaining essentially unchanged.

As further exemplification of complexing agents for zinc ion which have been found to increase the sensitivity of photoconductor zinc oxide copysheets, the following are presented: amine oxides (trimethylamine-N-oxide; N,N - dimethyl aniline - N - oxide; isonicotinamide-N - oxide; isonicotinic acid - N - oxide; N,N - dimethyl-alpha - naphthylamine - N - oxide), thiazoles (2-aminonaphtho - 1,2 - thiazole; 2 - p - dimethylaminophenylbenzthiazole; 2 - methyl benzthiazole), 1,2 - dithiole-3 - thiones (5 - phenyl - 1,2 - dithiole - 3 - thione), 1,2-pyrazoles (3,5 - dimethyl pyrazole), arsines (triphenyl arsine), phosphines (triphenyl phosphine), 1 - keto-3 - oxines (2 - ketopentane - 4 - oxime), 1,3 - dioximes (2,4 - pentanedione dioxime), 1,3 - diketones (2,4-pentanedione), sulfoxides (dimethyl sulfoxide, thiophene oxide), and oxazoles (2-thiobenzoxazole). Also useful are the complexing compounds from the classes oxazole (2-thiobenzoxazole), oxalones (2-phenyl-5[4-dimethylaminobenzlidene] oxalone, 2-phenyl-5[4-methoxy-benzylidene] oxalone), and phthalones (5-amino quinophthalone, 5 - diethylamino quinophthalone, 5-nitro quinophthalone). It has been observed that the most effective complexing agents are solvent soluble and are relatively planar and relatively symmetrical non-ionic molecules incorporating a conjugated system. From about 0.0001 to about 1.5% by weight of complexing agent is generally employed, based on the weight of photoconductor particles, although the optimum concentration will vary depending on the particular photoreducible sensitization dye or dyes in the system.

A variety of photoreducible sensitization dyes for photoconductor materials have been described in the literature, e.g. United States Patent No. 3,052,540. Particularly preferred are those in the xanthene class (e.g. eosin, erythrosin, phloxine B, Rhodamine 5G), the azine class (e.g. Safranine T), the thiazine class (e.g. methylene blue), the triphenylmethane class (e.g. malachite green, alphazurine), the ketoamine class (e.g. Brilliant Sulfoflavine FFA), the cyanine class (e.g. ethyl red), and the carbocyanine class (e.g. 3,3'-dimethyl thiacarbocyanine iodide).

It is apparent from the foregoing description that various modifications can be made in this invention without departing from either the spirit or scope thereof.

I claim:
1. A photoconductor sheet material comprising a flexible backing, uniformly adhered to a layer containing discrete particles of a zinc oxide and an organic binder, said zinc oxide particles being intimately associated with a photoreducible sensitization dye and from 10 to 100 molar excess of a complexing agent for zinc ions, based on the molar concentration of said dye, said complexing agent when used in the absence of said photoreducible sensitization dye having essentially no sensitization properties for said zinc oxide.

2. The photoconductor sheet material of claim 1 wherein said complexing agent for zinc ions is triethanolamine.

3. The photoconductor sheet material of claim 1 wherein said complexing agent for zinc ions is 2,4-pentanedione.

4. A photoconductor sheet material comprising a flexible backing having an electrically conductive surface uniformly adhered to a layer containing discrete particles of zinc oxide and an organic binder, said zinc oxide particles being intimately associated with a photoreducible sensitization dye and from 10 to 100 molar excess of a complexing agent for zinc ions based on the molar concentration of said dye, said complexing agent when used in the absence of said photoreducible sensitization dye having essentially no sensitization properties for said zinc oxide.

5. A photoconductor sheet material comprising a flexible backing having an eletrically conductive surface uniformly adhered to a layer containing discrete particles of zinc oxide and an organic binder, said zinc oxide particles being intimately associated with a photoreducible sensitization dye and from 10 to 100 molar excess of an essentially colorless complexing agent for zinc ions based on the molar concentration of said dye, said complexing agent when used alone having essentially no sensitization properties for said zinc oxide.

6. In a dye sensitized dispersion of inorganic metallic photoconductor particles, said dispersion containing a photo reducible sensitization dye, the improvement which comprises a 10 to 100 molar excess of a complexing agent for the metal ions of said photoconductor based on the molar concentration of said dye, said complexing agent having essentially no sensitization properties for said inorganic photoconductor.

7. In a dye sensitized photoconductive zinc oxide dispersion suitable for preparing a photoconductor sheet material, said dispersion including a photo reducible sensitization dye, the improvement which comprises a 10 to 100 molar excess of a complexing agent for zinc ions based on the molar concentration of said dye, said complexing agent having essentially no sensitization properties for said zinc oxide.

8. The dye sensitized dispersion of claim 7 in which said complexing agent for zinc ions is triethanolamine.

9. The dye sensitized dispersion of claim 7 in which said complexing agent for zinc ions is 2,4-pentanedione.

10. In a dye sensitized photoconductive zinc oxide dispersion suitable for preparing a photoconductor sheet material, said dispersion including a photo reducible sensitization dye, the improvement which comprises a 10 to 100 molar excess of an essentially colorless complexing agent for zinc ions based on the molar concentration of said dye, said essentially colorless complexing agent having essentially no sensitization properties for said zinc oxide.

References Cited by the Examiner
UNITED STATES PATENTS

| | | |
|---|---|---|
| 2,413,163 | 12/1946 | Bacon. |
| 3,052,540 | 9/1962 | Greig _____ 96—1 |
| 3,128,179 | 4/1964 | Kendall et al. _____ 96—1 |
| 3,159,483 | 12/1964 | Behmenburg et al. _____ 96—1 |
| 3,197,307 | 7/1965 | Blake et al. _____ 96—1 |

NORMAN G. TORCHIN, *Primary Examiner.*

C. VAN HORN, *Assistant Examiner.*